US008711070B2

(12) United States Patent
Narimatsu

(10) Patent No.: US 8,711,070 B2
(45) Date of Patent: Apr. 29, 2014

(54) DISPLAY DEVICE AND PROJECTOR

(75) Inventor: Shuji Narimatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 13/418,686

(22) Filed: Mar. 13, 2012

(65) Prior Publication Data

US 2012/0242714 A1    Sep. 27, 2012

(30) Foreign Application Priority Data

Mar. 22, 2011    (JP) ................................. 2011-062563

(51) Int. Cl.
*G09G 3/36*    (2006.01)
(52) U.S. Cl.
USPC .............................................. 345/87; 353/84
(58) Field of Classification Search
None
See application file for complete search history.

(56) References Cited

U.S. PATENT DOCUMENTS

| 7,336,325 | B2 * | 2/2008 | Hong | 349/61 |
| 7,394,597 | B2 * | 7/2008 | Penn | 359/629 |
| 2005/0140636 | A1 * | 6/2005 | Chung et al. | 345/98 |

FOREIGN PATENT DOCUMENTS

| JP | A-2000-035569 | 2/2000 |
| JP | A-2002-341439 | 11/2002 |

* cited by examiner

*Primary Examiner* — Joseph Haley
(74) *Attorney, Agent, or Firm* — Oliff PLC

(57) ABSTRACT

Since green is expressed by the first sub-pixels and the second sub-pixels, and at the same time, red is expressed by the third sub-pixels using the yellow illumination light, and green is expressed by the first sub-pixels and the second sub-pixels, and at the same time, blue is expressed by the third sub-pixels using the cyan illumination light, the display device can assure the apparent resolution and the brightness using the first and second sub-pixels with greenish color. It should be noted that red and blue can be expressed by the third sub-pixels with magenta color.

14 Claims, 6 Drawing Sheets

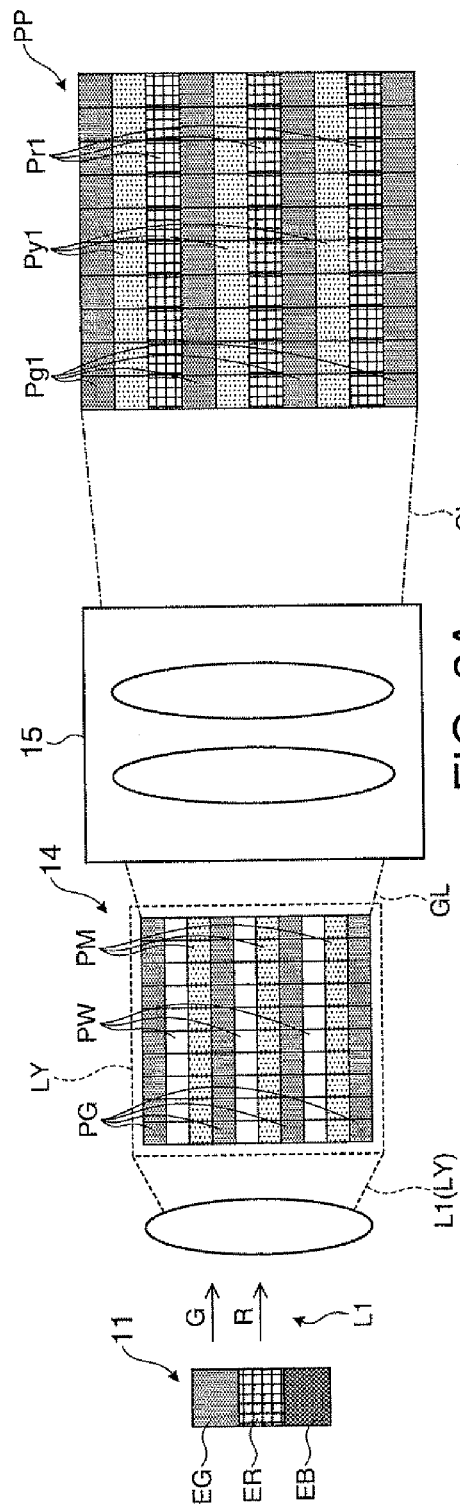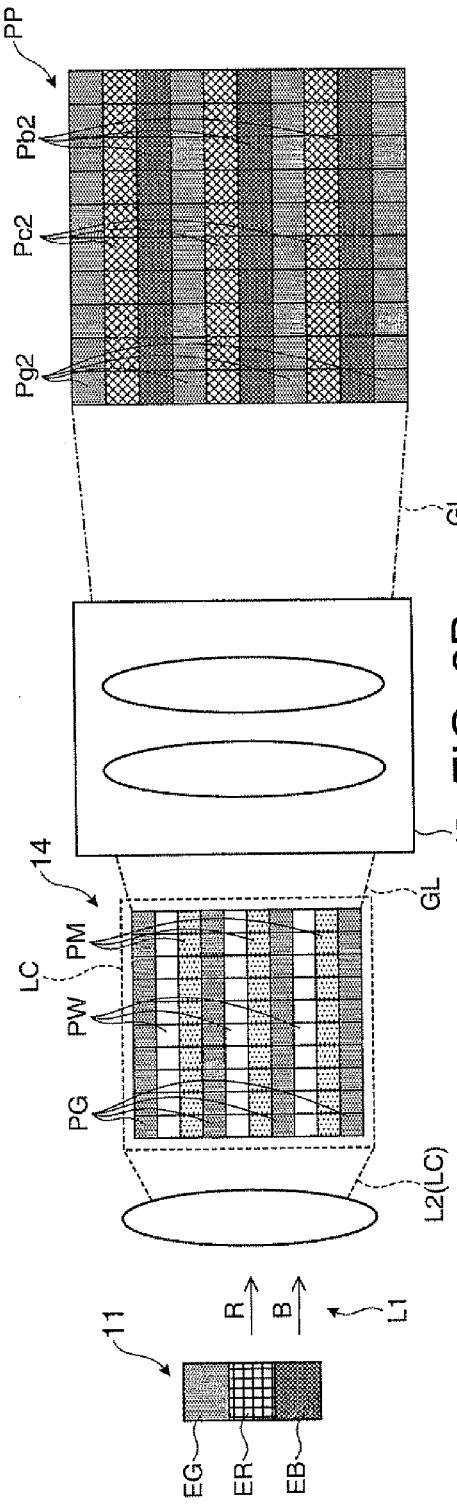

DISPLAY DEVICE AND PROJECTOR

BACKGROUND

1. Technical Field

The present invention relates to a display device capable of displaying a color image and a projector using the display device.

2. Related Art

As a projector provided with a display device, there has been a device of projecting color image light, which is displayed on a color liquid crystal panel color-coded with an interference color filter, on a screen using a lens in an enlarged manner (see FIG. 7 of JP-A-2000-35569 (Document 1)).

Further, there has been a device of making illumination light enter a color switch to thereby sequentially output a red light beam, a green light beam, and a blue light beam, then illuminating a reflective liquid crystal display element with these light beams via a polarization beam splitter, and then taking out picture light beam due to branching in the polarization beam splitter (see FIG. 3 of JP-A-2002-341439 (Document 2)).

However, the color liquid crystal panel used in the projector of Document 1 is color-coded with the color filter into red, blue, and green, and is required to have the number of pixels more than three times of the required resolution. Therefore, the panel problematically grows in size, or the aperture ratio is problematically lowered.

Further, such a projector as described in Document 2 has high request level to the response speed, and in particular in the case of using the liquid crystal panel, it becomes difficult to keep the response speed proper, and a device is required in the way of scanning of scan lines.

It should be noted that in a color liquid crystal panel incorporating a color filter, there exists a method called a Bayer method for reducing the number of sub-pixels. In this method, the ratio of the sub-pixel numbers of green, red, and blue is set to 2:1:1, and the sub-pixel number of green is made coincide with the resolution. In this case, there is used the fact that by making the sub-pixel number of green coincide with the resolution, the apparent feeling of resolution is not damaged even if the sub-pixel number of red or blue is reduced to half, and there is an advantage that the total sub-pixel number is suppressed to two times of the resolution.

SUMMARY

An advantage of some aspects of the invention is to provide a display device capable of preventing the sub-pixel number from increasing while keeping the response speed, and a projector using the display device.

An aspect of the invention is directed to a display device including (a) a light modulation element having at least one first sub-pixel with green color, at least one second sub-pixel including green color, and at least one third sub-pixel with magenta color, and (b) a light source capable of illuminating the light modulation element with yellow illumination light and cyan illumination light, (c) green is expressed by the first sub-pixel and the second sub-pixel, and red is expressed by the third sub-pixel using the yellow illumination light, and (d) green is expressed by the first sub-pixel and the second sub-pixel, and blue is expressed by the third sub-pixel using the cyan illumination light.

Since in the display device described above, green is expressed by the first sub-pixel and the second sub-pixel, and at the same time red is expressed by the third sub-pixel using the yellow illumination light, and green is expressed by the first sub-pixel and the second sub-pixel, and at the same time, blue is expressed by the third sub-pixel using the cyan illumination light, the display device can assure the apparent resolution and the brightness using the first and second sub-pixels with greenish color. It should be noted that red and blue can be expressed by the third sub-pixel with magenta color.

In a specific aspect of the invention, a ratio of the total number of the first and second sub-pixels and the number of the third sub-pixel(s) is 2:1. In this case, the apparent resolution can be assured by the first and second sub-pixels with greenish color, namely two-thirds of the total sub-pixels.

According to another aspect of the invention, in the display device described above, the second sub-pixel is a white sub-pixel. In this case, it is possible to improve the resolution and the brightness while restraining the luminance of green color to keep the color balance.

According to still another aspect of the invention, the light source illuminates the light modulation element while switching between the yellow illumination light and the cyan illumination light in a time-sharing manner. In this case, the color image can be displayed by operating the single light modulation element while switching between the display states thereof.

According to yet another aspect of the invention, when illuminating the first sub-pixel with green color, the second sub-pixel with white color, and the third sub-pixel with magenta color with the yellow illumination light, the third sub-pixel with magenta color is operated by a red signal, and the first sub-pixel with green color and the second sub-pixel with white color are operated by a green signal, and when illuminating the first sub-pixel with green color, the second sub-pixel with white color, and the third sub-pixel with magenta color with the cyan illumination light, the third sub-pixel with magenta color is operated by a blue signal, and the first sub-pixel with green color and the second sub-pixel with white color are operated by a green signal. In this case, it results that yellow and cyan are expressed by the second sub-pixel with white color, and as a result, original green color is expressed in a reinforcing manner using green added with white.

According to still yet another aspect of the invention, the light source includes a green light emitting element, a red light emitting element, and a blue light emitting element, lights the green light emitting element and the red light emitting element when illuminating the light modulation element with the yellow illumination light, and lights the green light emitting element and the blue light emitting element when illuminating the light modulation element with the cyan illumination light. In this case, yellow color and cyan color can easily be formed using the combination of the light emitting elements.

According to further another aspect of the invention, the light modulation element is a liquid crystal display device. In this case, even if the response speed of display is low, the quality of display can be improved by decreasing the frequency of rewriting of the light modulation element.

Still further another aspect of the invention is directed to a projector including (a) the display device described above, and (b) a projection lens adapted to project an image formed by the display device.

According to the display device described above, a high-quality image can be projected using the high-resolution bright display device.

BRIEF DESCRIPTION OF THE DRAWINGS

The invention will be described with reference to the accompanying drawings, wherein like numbers reference like elements.

FIG. 3A is a conceptual diagram for explaining a first display state of the liquid crystal panel, and FIG. 3B is a conceptual diagram for explaining a second display state of the liquid crystal panel.

DESCRIPTION OF AN EXEMPLARY EMBODIMENT

Figure 1:
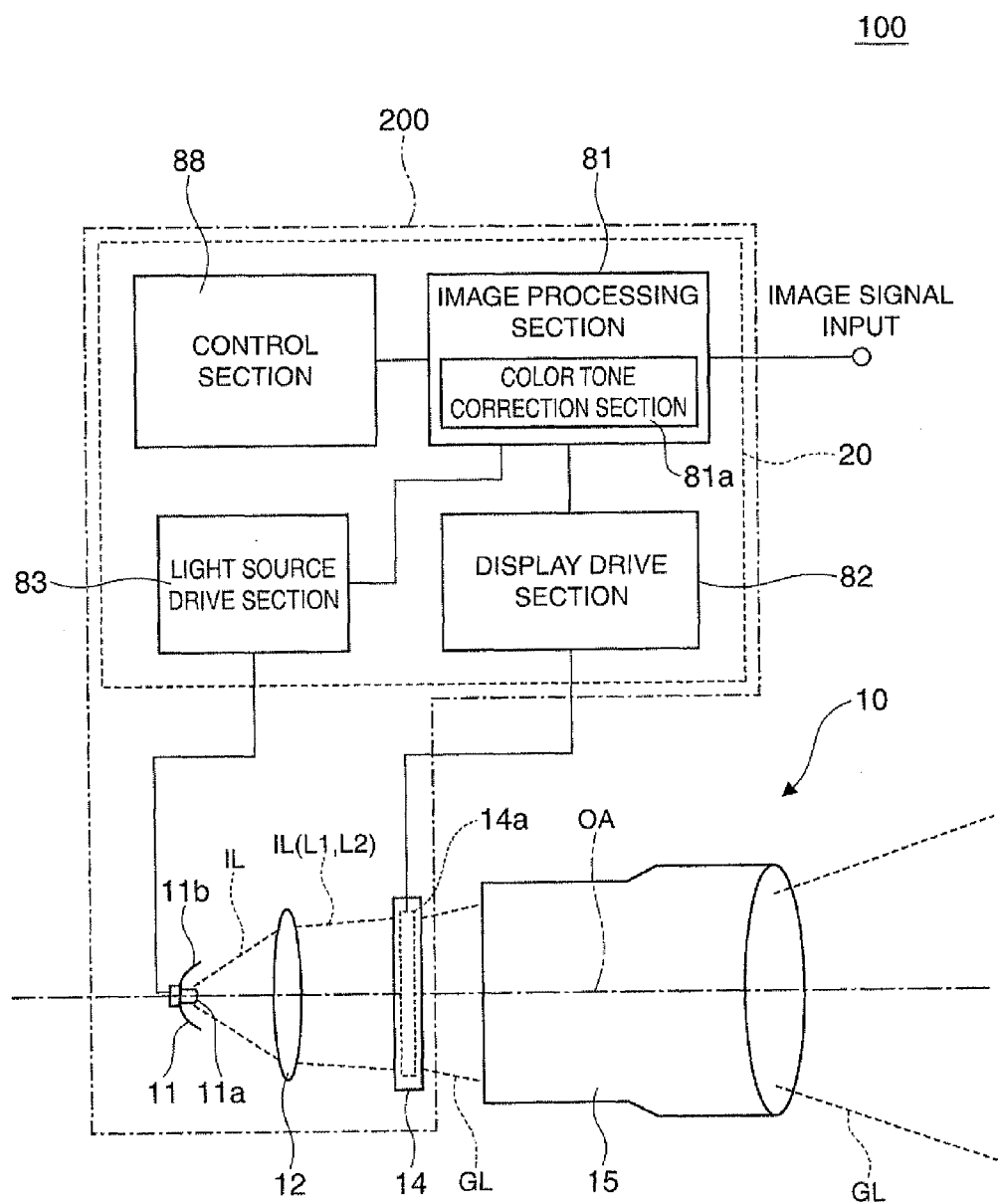
FIG. 1 is a block diagram for explaining a structure of a projector according to an embodiment of the invention.

As shown in FIG. 1, the projector 100 is provided with an optical system part 10 and a circuit device 20.

The optical system part 10 is provided with a light source 11 for illumination, a lens 12 for light beam adjustment, a liquid crystal display device 14 as a light modulation element, and a projection lens 15 for enlarged projection.

Figure 2A:
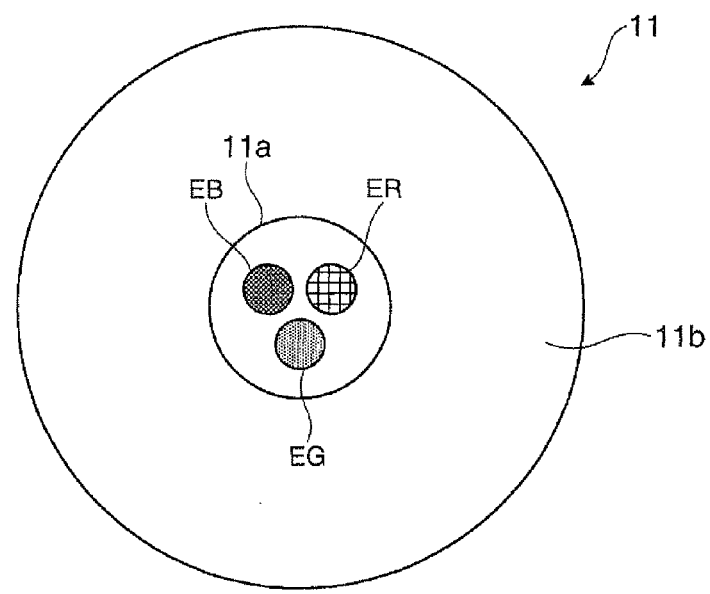
FIG. 2A is a diagram for explaining a structure of a light source.

As schematically shown also in FIG. 2A, the light source 11 is provided with a light emitting section 11a for emitting illumination light IL for illuminating the liquid crystal display device 14 shown in FIG. 1, and a concave mirror 11b for light collection for controlling the emission state of the illumination light IL. In this case, the light emitting section 11a incorporates three light emitting elements EG, ER, and EB. The first light emitting element EG generates green illumination light, the second light emitting element ER generates red illumination light, and the third light emitting element EB generates blue illumination light. These light emitting elements EG, ER, and EB are each formed of, for example, an LED, and can be made to emit light at an individual timing. In a specific operation, by lighting the green light emitting element EG and the red light emitting element ER at the same time, first illumination light L1 with yellow color can be emitted from the light emitting section 11a, and by lighting the green light emitting element EG and the blue light emitting element EB at the same time, second illumination light L2 with cyan color can be emitted from the light emitting section 11a. It should be noted that the emission luminance can be made equal between the light emitting elements EG, ER, and EB of the respective colors, or can be provided with an appropriate luminance difference between the colors to thereby adjust the color balance of the illumination light IL to a desired state.

Returning to FIG. 1, the liquid crystal display device 14 is for spatially modulating the illumination light IL from the light source 11, and is provided with a liquid crystal panel 14a having a structure of sandwiching a liquid crystal layer with a pair of substrates each provided with a transparent electrode and so on, and a pair of polarization plates (not shown) disposed so as to sandwich the liquid crystal panel 14a from the both sides along the optical axis OA. The liquid crystal display device 14 modulates the illumination light IL having entered from the light source 11 via the lens 12 to thereby form image light GL.

Figure 2B:
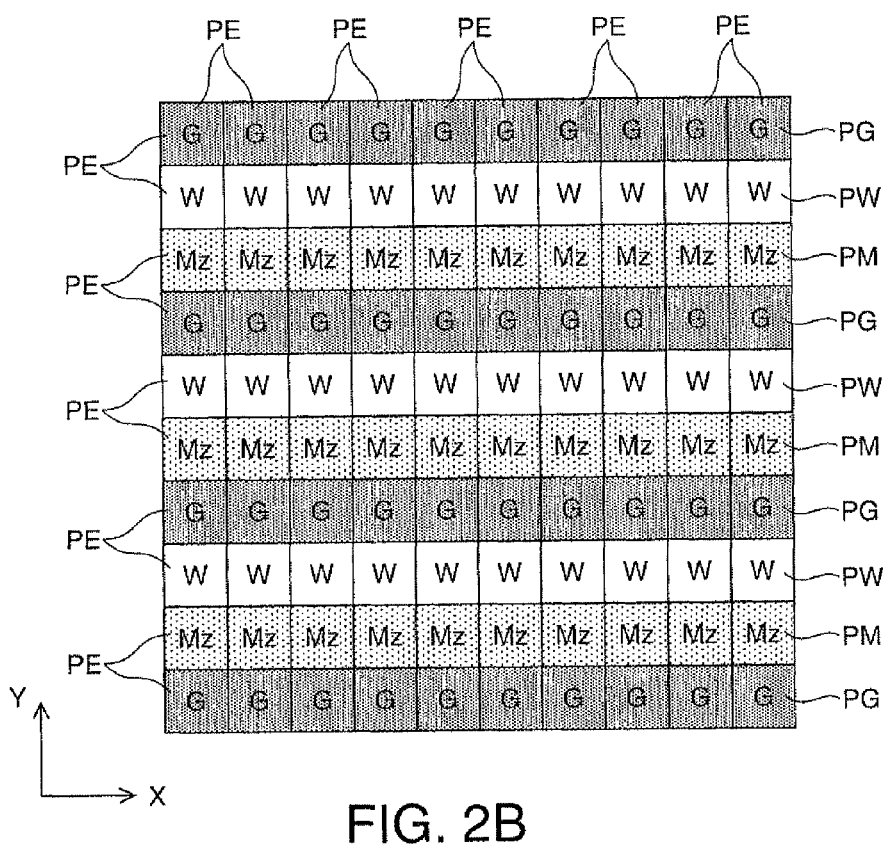
FIG. 2B is a diagram for explaining sub-pixels constituting a liquid crystal panel.

As schematically shown in FIG. 2B, the sub-pixels PE constituting the liquid crystal panel 14a are obtained by segmentalizing the color display pixels (so called pixels), evenly arranged two-dimensionally in vertical and horizontal directions, and sectioned into first sub-pixels PG with green color, second sub-pixels PW with white color, and third sub-pixels PM with magenta color. Firstly, the first sub-pixels PG (G) with green color are tightly arranged in a lateral line in an X direction. The second sub-pixels PW (W) with white color are tightly arranged in a lateral line in the X direction so as to be adjacent to a −Y side of the first sub-pixels PG with green color. The third sub-pixels PM (Mz) with magenta color are tightly arranged in a lateral line in the X direction so as to be adjacent to a −Y side of the second sub-pixels PW with white color. Further, the first sub-pixels PG (G) with green color are tightly arranged in a lateral line in the X direction so as to be adjacent to a −Y side of the third sub-pixels PM with magenta color. As described above, in the case of the present embodiment, the sub-pixels PE with the same color are arranged in the lateral X direction, and the sub-pixels PE with green color, the white color, and the magenta color are periodically arranged in the vertical Y direction. Here, regarding the first sub-pixels PG with green color and the third sub-pixels PM with magenta color, the color filters with the colors corresponding respectively thereto are formed so as to cover the apertures of the respective sub-pixels PE. Regarding the second sub-pixels PW with white color, no color filter with the color corresponding thereto is provided. It should be noted that a transparent film or the like for equalizing the cell thickness can be provided instead of the color filter. It should be noted that although the explanation is omitted for the sake of simplification, black matrix can be disposed on the boundaries between the sub-pixels PG, PW, and PM in order to prevent color mixture between the sub-pixels PG, PW, and PM.

In the case described hereinabove, the proportions of the green first sub-pixels PG, the second sub-pixels PW with white color, and the third sub-pixels PM with magenta color are equal to each other, namely 1:1:1. In other words, the ratio of the total number of the first and second sub-pixels PG, PW and the number of the third sub-pixels PM is 2:1.

Returning to FIG. 1, the projection lens 15 projects the image light GL, which is modulated by the liquid crystal display device 14, on a screen not shown as an enlarged color image.

The circuit device 20 is provided with an image processing section 81 to which an external image signal such as a video signal is input, a display drive section 82 for driving the liquid crystal display device 14 provided to the optical system part 10 based on the output of the image processing section 81, a light source drive section 83 for driving the light source 11 provided to the optical system part 10 based on the output of the image processing section 81, and a main control section 88 for performing overall control of the operations of these circuit parts 81, 82, 83, and so on.

The image processing section 81 is provided with a color tone correction section 81a for converting the external image signal input thereto into the image signal including the tones of the respective colors. The color tone correction section 81a makes it possible to make the light modulation operation by the sub-pixels PE constituting the liquid crystal panel 14a of the liquid crystal display device 14 appropriate. It should be noted that it is also possible for the image processing section 81 to perform various image processing such as distortion correction or color correction on the external image signal.

The display drive section 82 can drive the liquid crystal display device 14 based on the image signal output from the image processing section 81 to thereby make the liquid crystal display device 14 form the image corresponding to the image signal. In other words, the display drive section 82 individually operates the sub-pixels PE (the sub-pixels PG, PW, and PM of the respective colors) provided to the liquid crystal panel 14a of the liquid crystal display device 14 based on the image signal from the image processing section 81. Specifically, the display drive section 82 outputs a drive signal for appropriately varying the light transmission in each of the sub-pixels PE of the liquid crystal panel 14a to the liquid crystal panel 14a to thereby make the liquid crystal panel 14a periodically perform rewriting of the pixel drive signal in each of the sub-pixels PE.

The light source drive section 83 can drive the light source 11 based on a lighting signal output from the image processing section 81 to thereby make the light source 11 perform lighting in a state corresponding to the lighting signal. In other words, the light source drive section 83 can individually light the light emitting elements EG, ER, and EB included in the light source 11. In the case of the present embodiment, the green light emitting element EG and the red light emitting element ER in the light source 11 are lighted at the same time at a first timing to thereby emit the first illumination light L1 with yellow color from the light emitting section 11a. Further, the green light emitting element EG and the blue light emitting element EB in the light source 11 are lighted at the same time at a second timing to thereby emit the second illumination light L2 with cyan color from the light emitting section 11a.

In the projector 100 described above, a part composed of the light source 11, the lens 12, and the liquid crystal display device 14 out of the optical system part 10 and the circuit device 20 constitutes a display device 200, and forms a part capable of displaying an image by itself.

FIGS. 3A and BE are conceptual diagrams for explaining a basic operation of the optical system part 10 and so on.

FIG. 3A shows a first display state by the optical system part 10, wherein the light source 11 lights the green light emitting element EG and the red light emitting element ER at the same time as the first timing to thereby emit the first illumination light L1 with yellow color from the light emitting section 11a. As a result of this operation, the liquid crystal display device 14 or the liquid crystal panel 14a is illuminated with the yellow illumination light LY, and the image PP projected by the projection lens 15 includes sub-display pixels Pg1 corresponding to the first sub-pixels PG with green color, sub-display pixels Py1 corresponding to the second sub-pixels PW with white color, and sub-display pixels Pr1 corresponding to the third sub-pixels PM with magenta color. These sub-display pixels Pg1, Py1, and Pr1 are arranged in respective lines in the lateral direction and at the same time repeatedly disposed in series in the vertical direction in accordance with the sub-pixel arrangement of the liquid crystal panel 14a. Here, the first sub-pixels PG with green color are illuminated with the yellow illumination light LY of the first illumination light L1, but perform green display as a result since the red component is eliminated by the color filter. In other words, the sub-display pixels Pg1 are observed as green display. Then, the second sub-pixels PW with white color are illuminated with the yellow illumination light LY of the first illumination light L1, and perform yellow display since no extinction is performed by the color filter. In other words, the sub-display pixels Py1 are observed as yellow display. Finally, the third sub-pixels PM with magenta color are illuminated with the yellow illumination light LY of the first illumination light L1, but perform red display as a result since the complementary color of magenta, namely the green component, is eliminated by the color filter. In other words, the sub-display pixels Pr1 are observed as red display.

FIG. 3B shows a second display state by the optical system part 10, wherein the light source 11 lights the green light emitting element EG and the blue light emitting element EB at the same time as the second timing to thereby emit the second illumination light L2 with cyan color from the light emitting section 11a. As a result of this operation, the liquid crystal display device 14 or the liquid crystal panel 14a is illuminated with the cyan illumination light LC, and the image PP projected by the projection lens 15 includes sub-display pixels Pg2 corresponding to the first sub-pixels PG with green color, sub-display pixels Pc2 corresponding to the second sub-pixels PW with white color, and sub-display pixels Pb2 corresponding to the third sub-pixels PM with magenta color. These sub-display pixels Pg2, Pc2, and Pb2 are arranged in respective lines in the lateral direction and at the same time repeatedly disposed in series in the vertical direction in accordance with the sub-pixel arrangement of the liquid crystal panel 14a. Here, the first sub-pixels PG with green color are illuminated with the cyan illumination light LC of the second illumination light L2, but perform green display as a result since the blue component is eliminated by the color filter. In other words, the sub-display pixels Pg2 are observed as green display. Then, the second sub-pixels PW with white color are illuminated with the cyan illumination light LC of the second illumination light L2, and perform cyan display since no extinction is performed by the color filter. In other words, the sub-display pixels Pc2 are observed as cyan display. Finally, the third sub-pixels PM with magenta color are illuminated with the cyan illumination light LC of the second illumination light L2, but perform blue display as a result since the complementary color of magenta, namely the green component, is eliminated by the color filter. In other words, the sub-display pixels Pb2 are observed as blue display.

Figure 4:
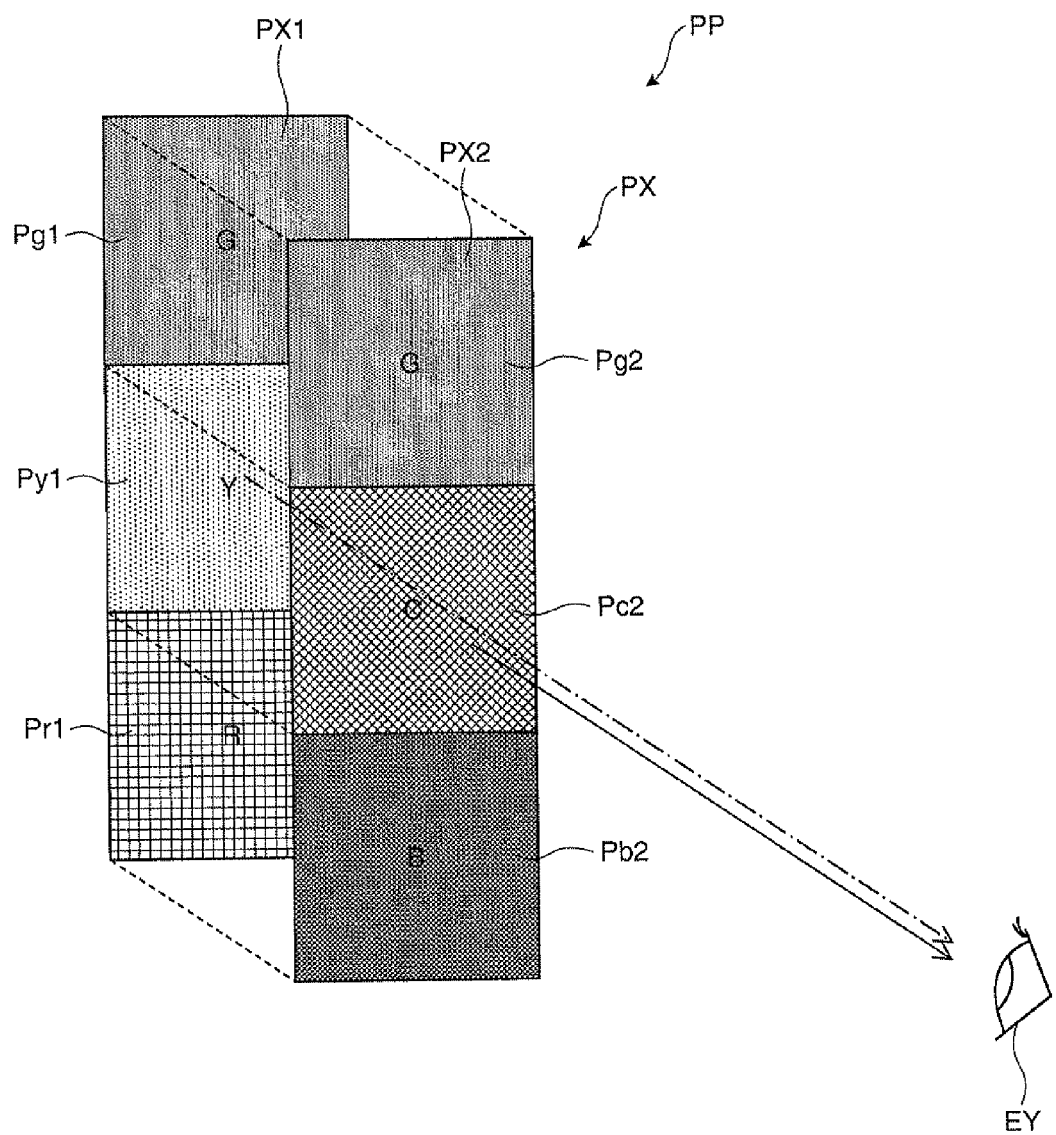
FIG. 4 is a diagram for conceptually explaining the display state of a color image using the projector.

The display state of a specific pixel (a specific color display pixel or a specific block pixel) PX in the image PP projected by the projection lens 15 will be explained with reference to FIG. 4. In the case of the illumination by the first illumination light L1 corresponding to FIG. 3A, namely when performing the illumination with the yellow illumination light LY obtained by lighting the green light emitting element EG and the red light emitting element ER in combination, the specific pixel PX is observed by the eyes EY of the observer as a first pixel (the block pixel) PX1 having the sub-display pixels Pg1, Py1, and Pr1 combined with each other. On the other hand, in the case of the illumination by the second illumination light L2 corresponding to FIG. 3B, namely when performing the illumination with the cyan illumination light LC obtained by lighting the green light emitting element EG and the blue light emitting element EB in combination, the specific pixel PX is observed by the eyes EY of the observer as a second pixel (the block pixel) PX2 having the sub-display pixels Pg2, Pc2, and Pb2 combined with each other. In other words, in the case of the yellow illumination (the first display state) by the first illumination light L1, the display is performed as the first pixel PX1 having the three sub-display pixels Pg1, Py1, and Pr1 composed of green, yellow, and red as a set, and in the case of the cyan illumination (the second display state) by the second illumination light L2, the display is performed as the second pixel PX2 having the three sub-display pixels Pg2, Pc2, and Pb2 composed of green, cyan, and blue as a set. Further, since the first pixel PX1 and the second pixel PX2 are switched in, for example, the time half as long as two frames, it results that the combination of the both pixels PX1, PX2 represents the color pixel (the pixel block) of a specific point in the image. In other words, the image signal of the specific point in the image to be projected corresponds to the combination of the signals corresponding to the both pixels PX1, PX2.

Figure 5:
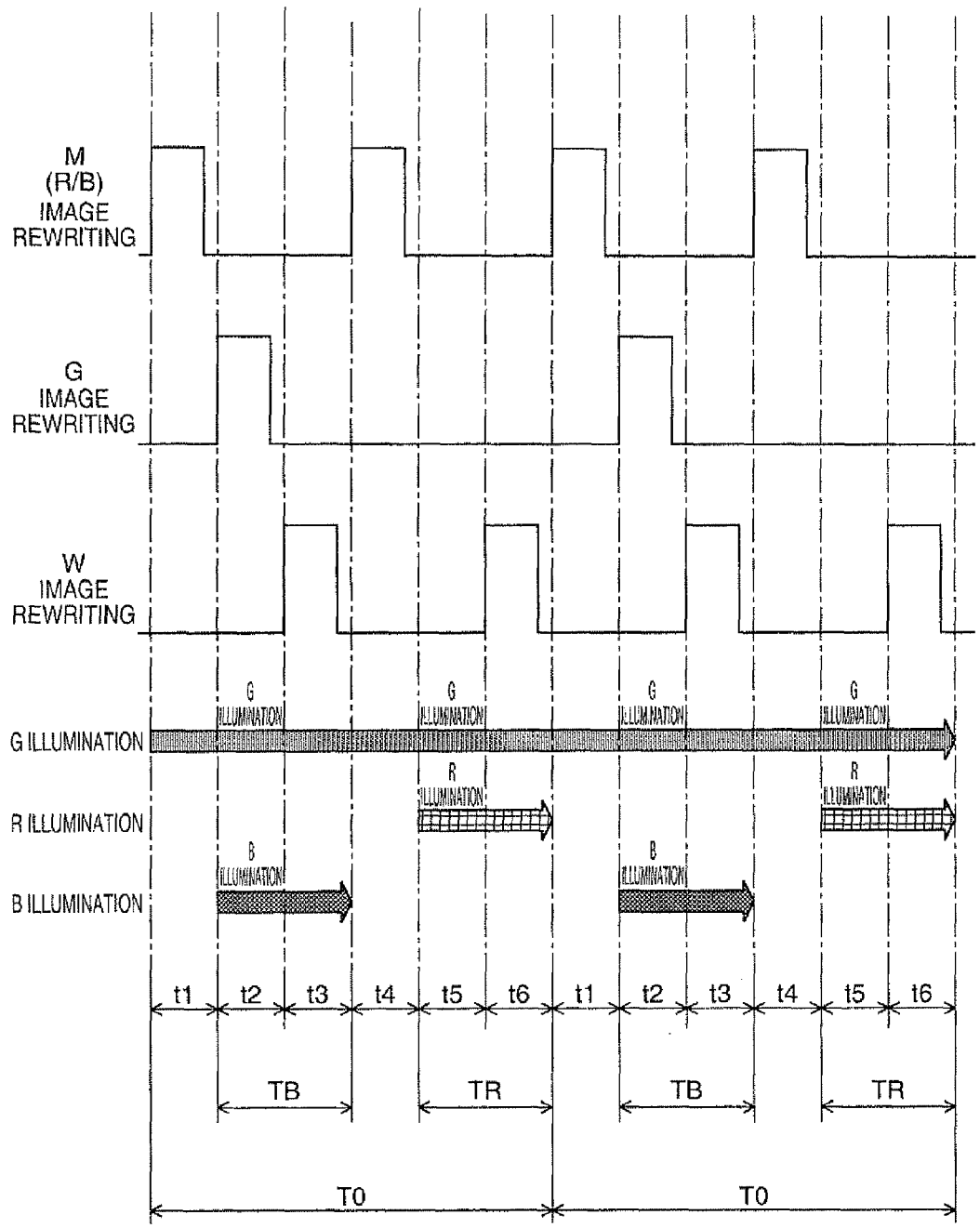
FIG. 5 is a chart for explaining an operation of the liquid crystal panel and the light source.

The specific operations of the liquid crystal display device 14 and the light source 11 will be explained based on FIG. 5. Firstly, the green light emitting element EG is always lighted, and the green illumination, namely G illumination, is continuous. Further, the red light emitting element ER is lighted periodically, and the red illumination, namely R illumination, is performed intermittently in the latter half period TR of the basic period T0 corresponding to the two frames. The blue light emitting element EB is also lighted periodically, and the blue illumination, namely B illumination, is performed intermittently in the former half period TB of the basic period T0.

Regarding the rewriting of the sub-pixels PG, PW, and PM of the respective colors, the rewriting of the drive signal (the blue signal) corresponding to blue color performed on the third sub-pixels PM with magenta color in the primary period t1 of the frame. On this occasion, the red light emitting element ER and the blue light emitting element EB are stopped in order to avoid color mixture. In a period t2 subsequent to the period t1, the rewriting of the drive signal (the green signal) corresponding to green color is performed on the first sub-pixels PG with green color. On this occasion, although the blue light emitting element EB is lighted, these sub-pixels do not interfere with each other. In a period t3 subsequent to the period t2, the rewriting of the drive signal (the green signal) corresponding to green color is performed on the second sub-pixels PW with white color. On this occasion, the blue light emitting element EB is lighted besides the green light emitting element EG, and the second sub-pixels PW with white color is illuminated with the yellow illumination light LY, namely the first illumination light L1. In a period t4 subsequent to the period t3, the rewriting of the drive signal (the red signal) corresponding to red color is performed on the third sub-pixels PM with magenta color. On this occasion, the red light emitting element ER and the blue light emitting element EB are stopped in order to avoid color mixture. In a period t5 subsequent to the period t4, the R illumination is started. In a period t6 subsequent to the period t5, the rewriting of the drive signal (the green signal) corresponding to green color is performed on the second sub-pixels PW with white color. On this occasion, the red light emitting element ER is lighted besides the green light emitting element EG, and the second sub-pixels PW with white color is illuminated with the cyan illumination light LC, namely the second illumination light L2.

In the operations described hereinabove, it results that the periods t2, t3 correspond to the first display state shown in FIG. 3A. Further, it results that the periods t5, t6 correspond to the second display state shown in FIG. 3B.

Figure 6A:
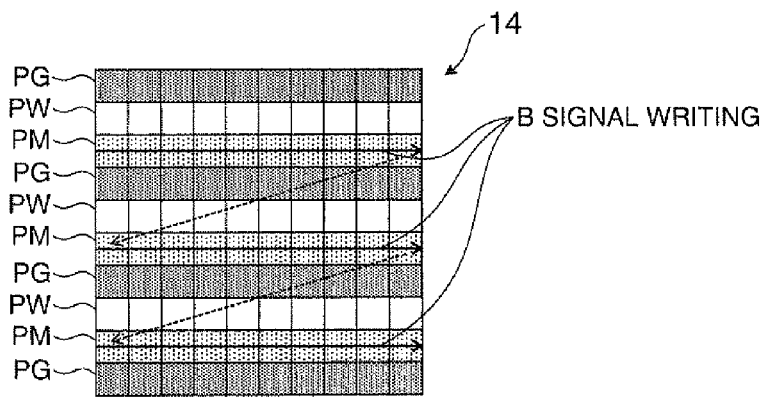
FIGS. 6A through 6D are diagrams for explaining information rewriting in the liquid crystal panel.
Figure 6B:
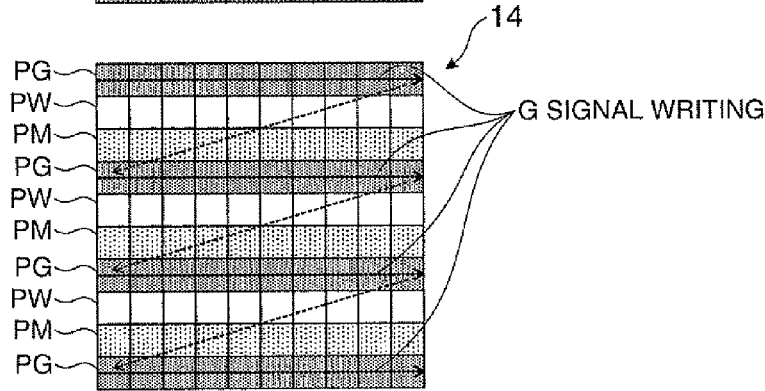
Figure 6C:
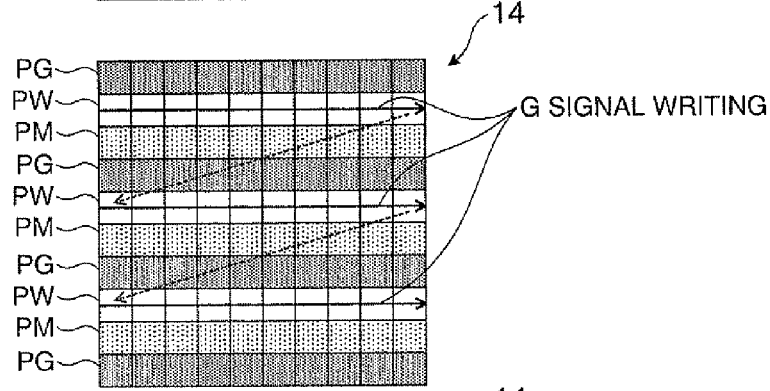
Figure 6D:
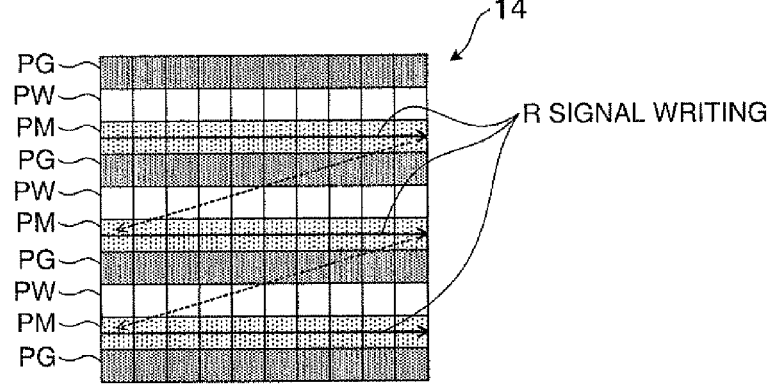

FIGS. 6A through 6D are diagrams for visually explaining the rewriting of the sub-pixels PG, PW, and PM of the respective colors. FIG. 6A shows the rewriting or writing of the blue signal to the third sub-pixels PM with magenta color, and illustrates the process during the period t1 shown in FIG. 5. Thus, the blue display by the third sub-pixels PM with magenta color is prepared. FIG. 6B shows the rewriting or writing of the green signal to the first sub-pixels PG with green color, and illustrates the process during the period t2 shown in FIG. 5. Thus, the green display by the first sub-pixels PG with green color is gradually updated. FIG. 6C shows the rewriting or writing of the green signal to the second sub-pixels PW with white color, and illustrates the process during the period t3 shown in FIG. 5. Thus, the green display (here, the yellow display) by the second sub-pixels PW with white color is gradually updated. FIG. 6D shows the rewriting or writing of the red signal to the third sub-pixels PM with magenta color, and illustrates the process during the period t4 shown in FIG. 5. Thus, the red display by the third sub-pixels PM with magenta color is prepared.

It should be noted that although in the period t2 shown in FIG. 6B the first sub-pixels PG with green color are rewritten while keeping the green light emitting element EG in the lighting state, the problem such as color mixture does not arise. Further, although in the period t3 shown in FIG. 6C the second sub-pixels PW with white color are rewritten while keeping the blue light emitting element EB in the lighting state, the problem such as color mixture does not arise. It should be noted that, although in the period t6 not shown the second sub-pixels PW with white color are rewritten in accordance with the green signal while keeping the red light emitting element ER in the lighting state, the problem such as color mixture does not arise. Regarding the second sub-pixels PW described hereinabove, the green display is performed by the whole of the combination of the yellow display in the periods t2, t3 and the cyan display in the periods t5, t6.

Here, the display with the second sub-pixels PW with white color will be explained in further detail. In the first display state shown in FIG. 3A, the yellow sub-display pixels Py1 are formed on the screen by the second sub-pixels PW with white color. Meanwhile, in the second display state shown in FIG. 3B, the cyan sub-display pixels Pc2 are formed on the screen by the second sub-pixels PW with white color. These processes correspond respectively to the periods t5, t6 (see FIG. 5) corresponding to the R illumination at the first timing and the periods t2, t3 (see FIG. 5) corresponding to the B illumination at the second timing, and are periodically repeated at a high rate, and therefore, the cyan sub-display pixels Pc2 and the yellow sub-display pixels Py1 are visually recognized as being combined with each other (see, for example, FIG. 4). Specifically, it results that the observer observes the color obtained by adding yellow and cyan to each other, namely the color obtained by adding white to green. Here, since roughly 80% of the luminance of white is derived from the green component, and white has a property of making the observer feel green if white is added to green, by adding white, it is possible to enhance the apparent brightness without changing the color tone. Further, by the second sub-pixels PW with white color in addition to the first sub-pixels PG with green color, the resolution of the projected image can be improved to be two times of the resolution obtained by the first sub-pixels PG with green color alone. Here, since the red sub-display pixels Pr1 and the blue sub-pixels Pb2 are formed by the third sub-pixels PM with magenta color, the resolution is formally degraded with respect to red color and blue color, but the apparent resolution is kept high due to the first sub-pixels PG with green color and the second sub-pixels PW with white color.

As described above, according to the projector 100 of the present embodiment, since green is expressed by the first sub-pixels PG and the second sub-pixels PW, and at the same time, red is expressed by the third sub-pixels PM using the yellow illumination light LY, and green is expressed by the first sub-pixels PG and the second sub-pixels PW, and at the same time, blue is expressed by the third sub-pixels PM using the cyan illumination light LC, the apparent resolution and the brightness can be assured due to the first and second sub-pixels PG, PW with greenish color. It should be noted that red and blue can be expressed by the third sub-pixels PM with magenta color. In the present embodiment, it results that the field sequential display is performed with respect to red and blue colors, and the continuous display is performed with respect to green color. Therefore, the color break-up can be made inconspicuous.

The invention is not limited to the embodiment described above, but can be put into practice in various forms within the scope of the invention.

For example, the second sub-pixels PW with white color can be changed to green sub-pixels added with a green color filter. Also in this case, it is possible to improve the resolution and the brightness of the image by increasing the sub-pixel density of green color. Further, the second sub-pixels PW with white color can be changed to yellow sub-pixels added with a yellow color filter. In other words, regarding the second sub-pixels PW, the color can arbitrarily be selected in accordance with the luminance of the light source, the color balance, and so on providing the color includes green color.

Further, the arrangement and the density of the sub-pixels PG, PW, and PM in the liquid crystal panel 14a are not limited to those shown in FIG. 2B, but can be set to, for example, the Bayer type. In this case, the two pixels out of the set of four pixels (i.e., the block pixels) can be assigned to either one of green, white, and magenta.

Although in the embodiment described above it is assumed that the light emitting elements EG, ER, and EB of the light source 11 are each formed of the LED, the light emitting elements EG, ER, and BB can also be formed of other light emitting elements.

Although in the embodiment described above, the illumination light IL from the light source 11 is used without modulation, it is also possible to align the polarization direction of the illumination light IL to a specific direction.

The liquid crystal panel 14a is not limited to the transmissive type, but can be set to the reflective type. It should be noted here that "transmissive type" denotes that the liquid crystal panel is a type of transmitting the light, and "reflective type" denotes that the liquid crystal panel is a type of reflecting the light.

As the projector, a front projector performing image projection form a direction of observing the projection screen and a rear projector performing image projection from the opposite direction of observing the projection screen can be cited, and the configuration of the projector shown in FIG. 1 and so on can be applied to either of the types of the projectors.

It is also possible to use the digital micromirror device or the like having micromirrors each provided with a color filter as the sub-pixels as the light modulation element instead of the liquid crystal panel 14a.

The entire disclosure of Japanese Patent Application No. 2011-062563, filed Mar. 22, 2011 is expressly incorporated by reference herein.

What is claimed is:

1. A display device comprising:
a light modulation element having at least one first sub-pixel with green color, at least one second sub-pixel including green color, and at least one third sub-pixel with magenta color; and
a light source capable of illuminating the light modulation element with yellow illumination light and cyan illumination light,
wherein green is expressed by the first sub-pixel and the second sub-pixel, and red is expressed by the third sub-pixel using the yellow illumination light, and
green is expressed by the first sub-pixel and the second sub-pixel, and blue is expressed by the third sub-pixel using the cyan illumination light.

2. The display device according to claim 1, wherein a ratio of a total number of the first and second sub-pixels and a number of the third sub-pixel(s) is 2:1.

3. The display device according to claim 1, wherein the second sub-pixel is a white sub-pixel.

4. The display device according to claim 3, wherein the light source illuminates the light modulation element while switching between the yellow illumination light and the cyan illumination light in a time-sharing manner.

5. The display device according to claim 4, wherein when illuminating the first sub-pixel with green color, the second sub-pixel with white color, and the third sub-pixel with magenta color with the yellow illumination light, the third sub-pixel with magenta color is operated by a red signal, and the first sub-pixel with green color and the second sub-pixel with white color are operated by a green signal, and
when illuminating the first sub-pixel with green color, the second sub-pixel with white color, and the third sub-pixel with magenta color with the cyan illumination light, the third sub-pixel with magenta color is operated by a blue signal, and the first sub-pixel with green color and the second sub-pixel with white color are operated by a green signal.

6. The display device according to claim 1, wherein the light source includes a green light emitting element, a red light emitting element, and a blue light emitting element, lights the green light emitting element and the red light emitting element when illuminating the light modulation element with the yellow illumination light, and lights the green light emitting element and the blue light emitting element when illuminating the light modulation element with the cyan illumination light.

7. The display device according to claim 1, wherein the light modulation element is a liquid crystal display device.

8. A projector comprising:
the display device according to claim 1; and
a projection lens adapted to project an image formed by the display device.

9. A projector comprising:
the display device according to claim 2; and
a projection lens adapted to project an image formed by the display device.

10. A projector comprising:
the display device according to claim 3; and
a projection lens adapted to project an image formed by the display device.

11. A projector comprising:
the display device according to claim 4; and
a projection lens adapted to project an image formed by the display device.

12. A projector comprising:
the display device according to claim 5; and
a projection lens adapted to project an image formed by the display device.

13. A projector comprising:
the display device according to claim 6; and
a projection lens adapted to project an image formed by the display device.

14. A projector comprising:
the display device according to claim 7; and
a projection lens adapted to project an image formed by the display device.

* * * * *